Nov. 13, 1928.  1,691,248
A. C. MUNRO
BALL FORMING MACHINE
Filed April 19, 1926   2 Sheets-Sheet 1
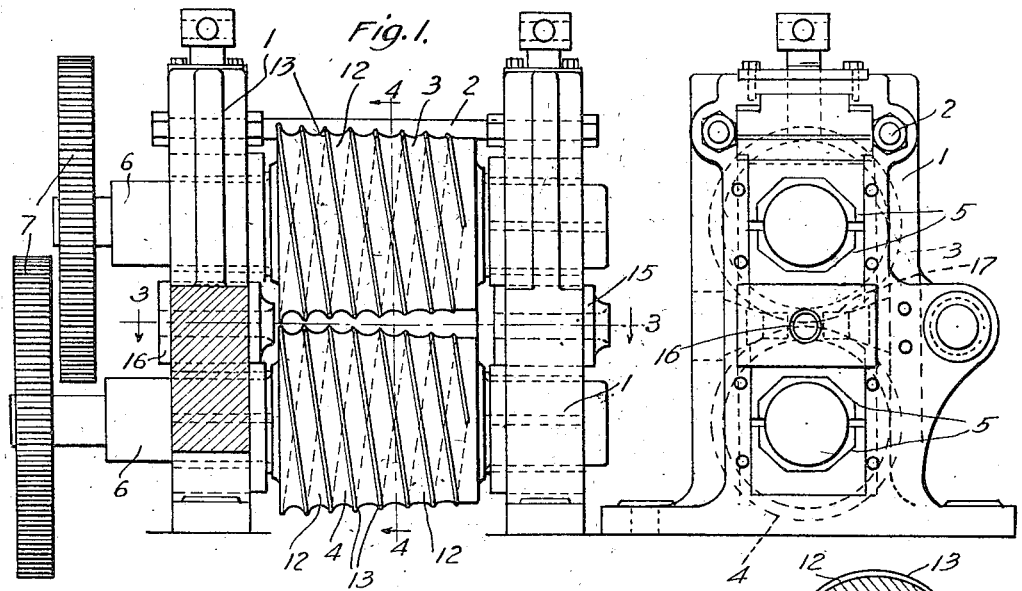
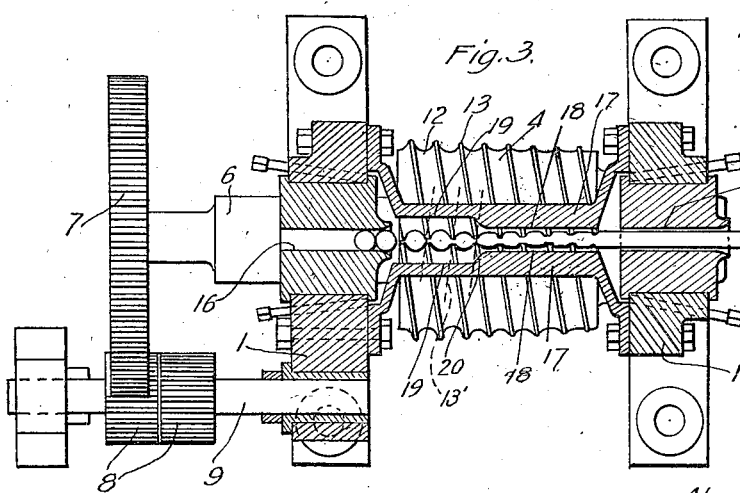
INVENTOR.
Alexander C. Munro
BY Arthur P. Knight
ATTORNEY.

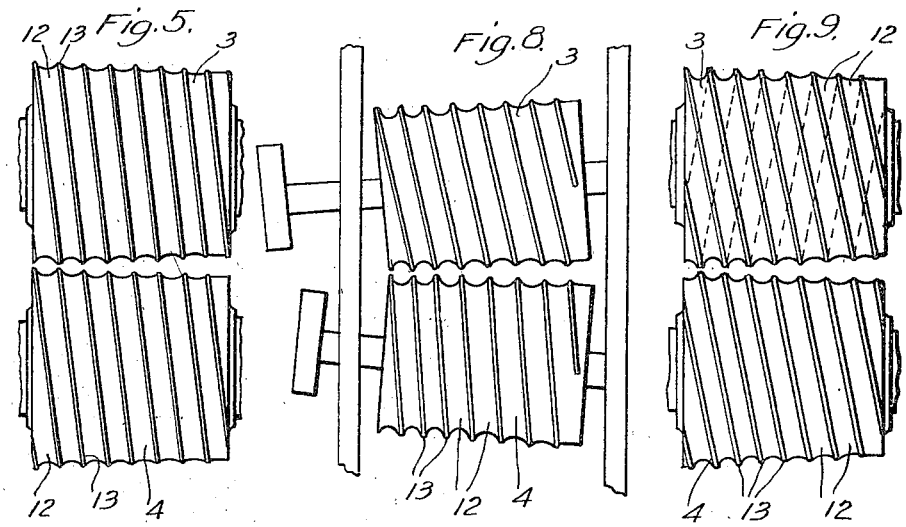
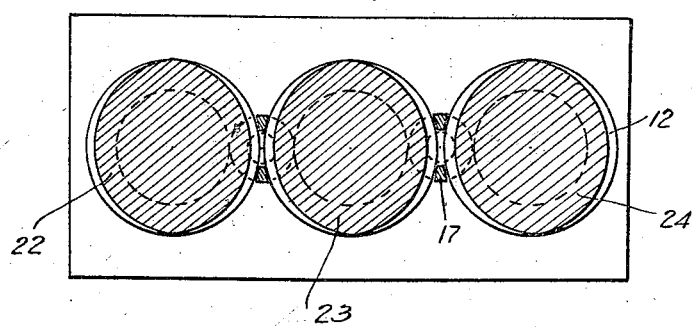
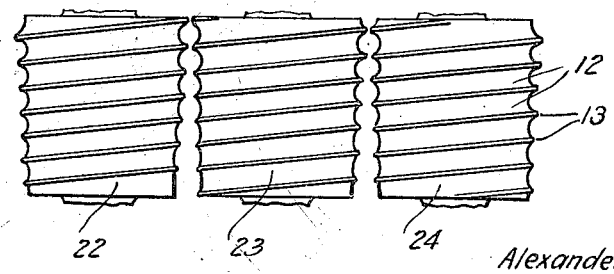

Patented Nov. 13, 1928.

1,691,248

UNITED STATES PATENT OFFICE

ALEXANDER C. MUNRO, OF BRITANNIA BEACH, BRITISH COLUMBIA, CANADA.

BALL-FORMING MACHINE.

Application filed April 19, 1926. Serial No. 102,917.

This invention relates to a machine for forming balls or other rounded shapes from rods, bars, or similarly shaped bodies of suitable metal such as steel and particularly for forming steel balls for use in grinding mills. The chief object of the invention is to provide a machine of this type which is continuous in operation that is to say in which the metal blank from which the balls are to be made is continually fed in at one end of the machine and the balls or other formed bodies are continually discharged at the other end of the machine. Another object of the invention is to provide a machine of this type which is effective and rapid in operation and is adapted to accurately form balls or rounded bodies of great uniformity and of any desired shape and size.

The machine which I prefer to use for this purpose comprises essentially a pair of similar slightly tapered forming rolls or dies, rotatably mounted with their axes parallel and provided with means for causing rotation in the same direction. Said rolls are provided, according to my invention, with similarly pitched multiple-threaded helical or spiral grooves extending from end to end of the rolls, said grooves corresponding in cross-sectional shape near the discharge end of the machine to the balls or bodies to be formed and the two rolls being so disposed relatively that corresponding or symmetrical parts of said grooves are at all times presented opposite one another in the forming zone between the rolls. The tapered rolls have their larger ends toward the discharge end of the machine so that the space between the rolls in the forming zone contracts toward such discharge end. The rods, bars, or other metal bodies from which the balls are to be formed are heated to a suitable temperature to permit forming thereof and are then fed in-between the rolls at the feed end and are gradually formed to the desired shape and at the same time continually drawn through between the rolls by engagement of the spiral grooves therewith. Due to the convergence of the space between the rolls toward the discharge ends of the machine, the metal is gradually squeezed and formed, to conform to the shape of the grooves. At the discharge end of the machine the rolls are brought substantially into tangential contact with one another so as to cut off or sever each completely formed ball from those behind and permit it to be discharged from the machine. Suitable guide means are provided for feeding the rod or bar into the machine at the proper point and any suitable means may be provided for conducting the balls away from the discharge end of the forming zone.

In a ball forming machine of this type it is necessary to provide means whereby the metal blank and the balls or other bodies being formed therefrom are maintained in the forming zone between the rolls instead of being forced or thrown out to one side or the other. A particular object of my invention is to cause the cutting grooves themselves, or the ridges therebetween, to hold the balls within the forming zone during the latter part of the formation thereof, at which point the rolls are so close to one another as to render it difficult if not impossible to provide satisfactory external supporting means therefor. This is accomplished by the use of multiple-threaded helical grooves, since by the use of grooves of this type, as distinguished from single-threaded grooves, the pitch is sufficiently great to prevent the balls during their formation from being moved out of the forming zone, due to engagement thereof with the oppositely inclined ridges or raised portions between the grooves on the opposing rolls as hereinafter explained. I prefer to provide external supporting means for the metal blank and the balls or other bodies during the first stages of their formation, at which time the forming rolls are relatively far apart, and to rely upon the rolls themselves to hold the balls in position only during the latter stages of their formation, when the rolls are so close together as to render it impracticable to provide external supporting means.

The accompanying drawings illustrate embodiments of my invention and referring thereto:

Fig. 1 is a side elevation of a ball forming machine for spherical balls according to my invention with the external guiding or supporting means for the balls removed.

Fig. 2 is an end view of such machine.

Fig. 3 is a horizontal section on line 3—3 in Fig. 1.

Fig. 4 is a vertical section on line 4—4 in Fig. 1.

Fig. 5 is a side elevation of a pair of forming rolls for making ellipsoidal balls.

Fig. 6 is a transverse vertical section and Fig. 7 a plan view of the forming rolls of a modified form of the invention.

Fig. 8 is a side elevation of another modification of the invention.

Fig. 9 is a side elevation of another modification of the invention.

The form of my invention shown in Figs. 1 to 4 comprises a frame consisting for example of end plates 1 connected by suitable tie rods 2. Forming rolls 3 and 4 are mounted to rotate in suitable bearing means 5 mounted in any suitable manner on end plates 1 and are provided with suitable driving means for rotating both of said rolls in the said direction, as indicated by the arrows in Fig. 4. For this purpose the shaft 6 of each of said rolls may be provided with an annular gear 7 meshing with a pinion gear 8 on drive shaft 9, which is adapted to be driven in any suitable manner.

Rolls 3 and 4 are shown as provided with similarly pitched double-threaded helical or spiral grooves 12 whose cross-section near the discharge end of the rolls corresponds to the shape of the rounded body to be formed, for example in the form shown, said grooves are substantially hemispherical in cross-section at this point and are hence adapted to form spherical bodies. The general shape of each of the rolls 3 and 4 is that of a frustum of a slightly tapering cone with its larger end toward the discharge end of the machine, so that at the feed end of the machine (which is shown at the right in Figs. 1 and 3), the ridges 13 between the grooves of the respective rolls are far enough apart to permit a rod, bar, or other metal blank to be inserted therebetween, and the grooves themselves are of correspondingly less depth at this point as shown and are preferably somewhat flattened in order to facilitate the first stages of the forming operation, while at the discharge end of the machine on the other hand, the ridges 13 are brought substantially into contact or tangency with one another while the corresponding portions of the opposing grooves cooperate to form a substantially circular space between the two rolls.

Suitable guide means indicated at 15 may be provided for guiding the metal blank into position between the forming rolls and suitable discharge means 16 may be provided for conducting away from the discharge end of the forming zone the formed balls or other bodies. Suitable guide or supporting means 17 may also be provided for maintaining the metal blank in the forming zone during the first stages of the formation of the balls therefrom. For this purpose said supporting means may have opposing bearing faces 18 extending part of the way through the forming zone, said bearing faces being spaced apart by substantially the width of the metal blank so as to hold the same accurately between the two opposing rolls. Said supporting means are however cut away as indicated at 19 near the discharge end of the machine due to the fact that at this point the ridges 13 of the opposing rolls are so close together as to render it impracticable to provide guide means extending inwardly far enough to engage the balls. The supporting means 17 may as shown be mounted on the end frame members 1.

In the operation of this form of my invention a metal rod or bar of any suitable cross-section for example a round bar from which the balls are to be formed is first heated in the usual manner to a sufficient temperature to permit forming of the metal to the desired shape. Said heated rod or bar is then fed into the machine as indicated at 21 (in Fig. 3) and the end of said bar is engaged between the helical grooves in the rotating rolls in such manner that the heated metal will be continually squeezed from a point between the ridges of the rolls to the space between the grooves and will gradually be formed to a shape conforming to the cross-section of such grooves. In the rotation of the rolls the bar will therefore be drawn further and further into the machine, and since the ridges 13 on the respective rolls gradually approach one another toward the discharge end of the machine the balls will be gradually formed into distinct bodies. Each of the bodies or balls as it is being shaped is continually rolled between the grooves of the two rolls and is thus caused to conform exactly to the shape of such grooves. The metal is thus gradually formed into the desired shape and is severed from the metal behind it just before leaving the machine due to the spiral ridges of the two rolls coming into contact at this point. The balls thus cut apart may be delivered through discharge means 16 to any suitable conveying or storage means. The rolls 3 and 4 thus constitute rotating dies adapted to cooperate not only in the forming of the balls but also to cut them off from the metal blank from which they are formed.

During the first portion of the movement of the blank through the forming zone it is supported and maintained therein by engagement with the bearing faces 18 on supporting means 17. After passing the shoulder 20 however the supporting means no longer engage the metal blank or the balls and it is a particular feature of my invention that at this time the oppositely inclined ridges of the opposing rolls act to prevent displacement of the balls from the forming zone. In order to more clearly show this fact I have indicated the direction of inclination of the ridges on the upper roll in dotted lines at 13′ in Fig. 3 and it will be seen that the ridges on the opposing rolls converge at such a considerable angle as to effectively prevent displacement of the balls from the central portion between the rolls. The necessary steep pitch and opposing inclination for this purpose can only be obtained by the use of similarly pitched multiple threaded grooves and the use of such multiple threaded and similarly pitched grooves therefore forms an important feature of my invention.

The cross-sectional shape of the groove may be modified so as to provide for formation of other rounded bodies than spherical balls. For example as shown in Fig. 5 the grooves may be semi-elliptical in cross-section, the machine being in that case adapted to form bodies having the shape of an ellipsoid of revolution.

Furthermore while I have shown only two forming rolls or dies it will be understood that any desired number of such rolls may be arranged vertically one above another or side by side or in any other suitable relation. For example, as shown in Figs. 6 and 7, three such rolls, 22, 23, and 24 may be provided side by side, the axes of such rolls being parallel and each pair of adjacent rolls being so disposed as to present corresponding portions of the similarly pitched multiple-threaded spiral grooves 12 opposite one another at all times so that a bar may be introduced and formed into balls or other bodies in the forming zone so constituted between each pair of adjacent rolls.

While I prefer to set the forming rolls with their axes parallel and to taper such rolls or the ridges thereof in order to provide a converging space between the same from the feed end to the discharge end, I may in some cases as shown in Fig. 8 make the rolls of substantially uniform diameter throughout their length and set the rolls at a slight angle to each other so that their axes converge toward the discharge end of the machine so as to cause the spiral ridges to cut deeper and deeper into the metal blank during formation of the balls. In any case however the construction is such that the opposing faces or peripheral surfaces of the adjacent forming rolls provide a forming zone between the rolls which converges from the feed end toward the discharge end, so that the projecting helical ridges cut further and further into the metal blank during its passage through such forming zone, and finally completely cut off the formed body from such metal blank. Furthermore, in any case the oppositely inclined ridges of the opposing rolls engage the balls during the last stages of their formation and serve to maintain the same within the forming zone without the use of external supporting means at this point, while external supporting means are provided for supporting the metal blank during the first stages of the formation of the balls therefrom.

Instead of using double threaded spiral grooves the multiplicity of the thread may be increased. For example as shown in Fig. 9 triple-threaded grooves may be used giving a still greater inclination to the ridges, which serve as before to support the balls in the forming zone during the latter stages of their formation. The invention should therefore be understood as including the use of forming rolls provided with multiple threaded helical grooves arranged in the manner above described.

What I claim is:

1. A ball forming machine comprising two rotary forming rolls provided with similarly pitched multiple-threaded helical grooves whose cross-section corresponds to the shape of the balls to be formed, said rolls being so constructed and mounted that corresponding portions of the grooves in the two rolls are presented opposite one another and that the space between the opposing peripheral surface portions of said rolls converges toward one end of the machine the pitch of said grooves being sufficiently steep to produce a relative inclination of the ridges between the groove on opposing portions of the rolls sufficient to hold the material being formed in position without the use of other guiding means at such portions.

2. A construction as set forth in claim 1, and comprising in addition supporting means adapted to support the metal blank and the balls while in the first portion of the forming zone, said rolls being sufficiently close together in the latter portion of the forming zone, and the grooves having sufficient inclination, to cause the rolls themselves to hold the balls in such latter portion.

3. A ball forming machine comprising two rotary frusto-conical forming rolls mounted adjacent one another and with their axes parallel, said rolls being provided with similarly pitched double-threaded helical grooves whose cross-section corresponds to the shape of the balls to be formed and being so disposed as to present corresponding portions of said grooves opposite one another and thus defining a forming zone at the line of tangency of said rows, the pitch of said grooves being sufficiently steep to produce a relative inclination of the ridges between the groove on opposing portions of the rolls sufficient to hold the material being formed in position without the use of other guiding means at such portions.

4. A ball forming machine comprising two rotary frusto-conical forming rolls mounted adjacent one another and with their axes parallel so as to provide a converging space between the rolls, said rolls being provided with similarly pitched double-threaded helical grooves whose cross-section at the smaller end of such space corresponds to the shape of the balls to be formed and being so disposed as to present corresponding portions of said grooves opposite one another, means for rotating said rolls in the same direction, means for feeding a metal blank into the larger end of the space between the rolls, and means for conducting away formed balls from the smaller end of such space the pitch of said grooves being sufficiently steep to produce a relative inclination of the ridges between the groove on opposing portions of the rolls sufficient to hold the material being formed in position without the use of other guiding means at such portions.

5. A ball forming machine as set forth in claim 4, said rolls being substantially tangent at their larger ends so as to provide for cutting off the formed balls.

6. A ball forming machine as set forth in claim 4, and comprising in addition supporting means adapted to support the metal blank and the balls being formed during the first portion of their passage through such converging space between the rolls so as to hold said blank and balls in said first portion of such space, the inclination of said grooves in the opposing rolls being sufficient to cause the rolls themselves to hold the balls in the remaining portion of the space between the rolls.

In testimony whereof I have hereunto subscribed my name this 6th day of April, 1926.

ALEXANDER C. MUNRO.